United States Patent [19]

Taylor et al.

[11] 4,171,607
[45] Oct. 23, 1979

[54] TWO-ROW TOBACCO HARVESTER

[76] Inventors: Miller Taylor; Oren M. Taylor; Jimmy N. Taylor, all of P.O. Box 518, Elizabethtown, N.C. 28337

[21] Appl. No.: 842,190

[22] Filed: Oct. 14, 1977

[51] Int. Cl.$^2$ .............................................. A01D 45/16
[52] U.S. Cl. ........................................................ 56/27.5
[58] Field of Search ................................. 56/27.5, 330

[56] References Cited

U.S. PATENT DOCUMENTS

| | | | |
|---|---|---|---|
| 2,876,610 | 3/1959 | West et al. | 56/27.5 |
| 3,686,842 | 8/1972 | Littau | 56/330 |
| 3,834,137 | 9/1974 | Long | 56/27.5 |
| 3,889,454 | 6/1975 | Bruel | 56/330 |
| 3,890,774 | 6/1975 | Bruel | 56/330 |
| 3,962,850 | 6/1976 | Moore | 56/27.5 |
| 4,035,998 | 7/1977 | Griner | 56/27.5 |

Primary Examiner—Russell R. Kinsey
Attorney, Agent, or Firm—Sughrue, Rothwell, Mion, Zinn and Macpeak

[57] ABSTRACT

The tobacco harvester as pulled by a tractor and is adapted to span two rows of tobacco simultaneously, two subframes are pivotally mounted from the main frame of the harvester and each subframe includes a pair of spaced apart flat header boards which are spaced apart so as to allow a row of tobacco plants to pass therebetween. A rotating defoliator blade is mounted above each header board and an adjustable deflector is adjustably mounted above each defoliator blade. A horizontal and vertical conveyor arrangement is disposed between each subframe and an identical conveyor arrangement is disposed along the outer side of each conveyor frame for receiving the tobacco leaves and conveying them rearwardly and upwardly to a transverse conveyor. Flexible fingers extend laterally from the opposed edges of each header board across the space between the header boards to prevent leaves from falling to the ground and flexible curtains are connected between the outer edges of the header boards and the adjacent horizontal conveyor to prevent leaves from falling to the ground. Hydraulic cylinders are connected between the rear wheels and the main frame to adjust the height of the frame.

8 Claims, 7 Drawing Figures

TWO-ROW TOBACCO HARVESTER

BACKGROUND OF THE INVENTION

1. Field of the Invention

The present invention is directed to tobacco harvesters and more specifically to a two-row tobacco harvester adapted to be pulled by a single tractor and having means for adjusting the height of the harvester as well as a unique defoliating and conveying arrangement for the tobacco leaves from the tobacco plants to a trailer.

2. Prior Art

For many years the harvesting of tobacco has been a manual operation. Tobacco has been harvested at a particular time in the growing season and the leaves of the plant ripen at different times. The leaves ripen progressively from the bottom to the top of the stock thereby necessitating five or six successive passes through the field to remove the ripened leaves. Such manual harvesting methods require a great deal of man power which has become increasingly scarce and more expensive in recent years.

The first type of mechanical tobacco harvester consisted primarily of a frame upon which the leaf primers would ride through the field as they manually removed the leaves.

In recent years various other types of mechanical tobacco harvesters were developed wherein the harvester would straddle a single row of tobacco plants in a rotating defoliator which stripped the lower leaves from the plant onto a conveyor mechanism for transfer to a suitable receptacle. The majority of these mechanical tobacco harvesters which carry out a priming operation are self-propelled and straddle one row of tobacco at a time. Other types of tobacco harvesters are adapted to be rigidly mounted on the side of a tractor but this type of tobacco harvester can only be utilized where the entire tobacco plant is cut and stripped since it is impossible to effectively operate on any row of tobacco except the one closest to the tractor. Generally tobacco fields are planted with every fifth row missing to allow for the passage of tractors and trailers through the field. Thus the tractor mounted units would be unable to harvest the middle rows of each group of four rows without first cutting down the outermost rows.

Pull type tobacco harvesters have also been developed which can be adjusted for movement behind the tractor so as to straddle either one of the first two rows closest to the fifth middle. In this way all four rows of tobacco can be harvested while the tractor remains in the fifth middle. Such harvesters generally have first and second defoliator means located on opposite sides of a row of tobacco which are mounted in a subframe for lateral movement relative to the main frame of the tobacco harvester to accommodate minor variations in row alignment. A plurality of rotatable rollers are mounted between each defoliator means in the subframe for laterally transferring the harvested leaves onto longitudinally moving conveyors mounted at each side of the main frame. The harvester is provided with substantially vertically disposed conveyor means for transferring the leaves upwardly to transversely dispose conveyor means which will deposit the leaves into a receptacle on a trailer movable along side the harvester.

SUMMARY OF THE INVENTION

The present invention provides an improved tobacco harvester which is adapted to be pulled by a tractor and simultaneously harvest the leaves from two rows of tobacco plants while the tractor remains in the fifth middle.

The present invention provides a new and improved two-row tobacco harvester which is provided with hydraulic means between the rear wheels and the main frame for adjustably positioning the main frame at different heights above the ground.

The present invention provides a new and improved two-row tobacco harvester having two subframes pivotally mounted from the main frame for independent lateral movement to accommodate variations in the rows of tobacco plants.

The present invention provides a new and improved two-row tobacco harvester wherein the speed of rotation of the defoliator blades in each subframe are adjustable as well as the height and angle of inclination of the defoliator blade relative to the ground. Adjustable flat rigid header boards are provided beneath each defoliator blade and adjustable flat rigid deflector blades are provided above each defoliator blade for deflecting the tobacco leaves which have been stripped from the plants onto a parallel longitudinally moving conveyor means. Flexible finger means extend from the opposed edges of each header board toward the opposite header board which will allow the passage of the stocks of the tobacco plants between the header board while preventing leaves from falling therebetween. Flexible curtains are also provided between the outside edge of each header board and the adjacent edge of each conveyor and side screens are provided along the opposite edge of each conveyor to prevent leaves from falling to the ground. The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
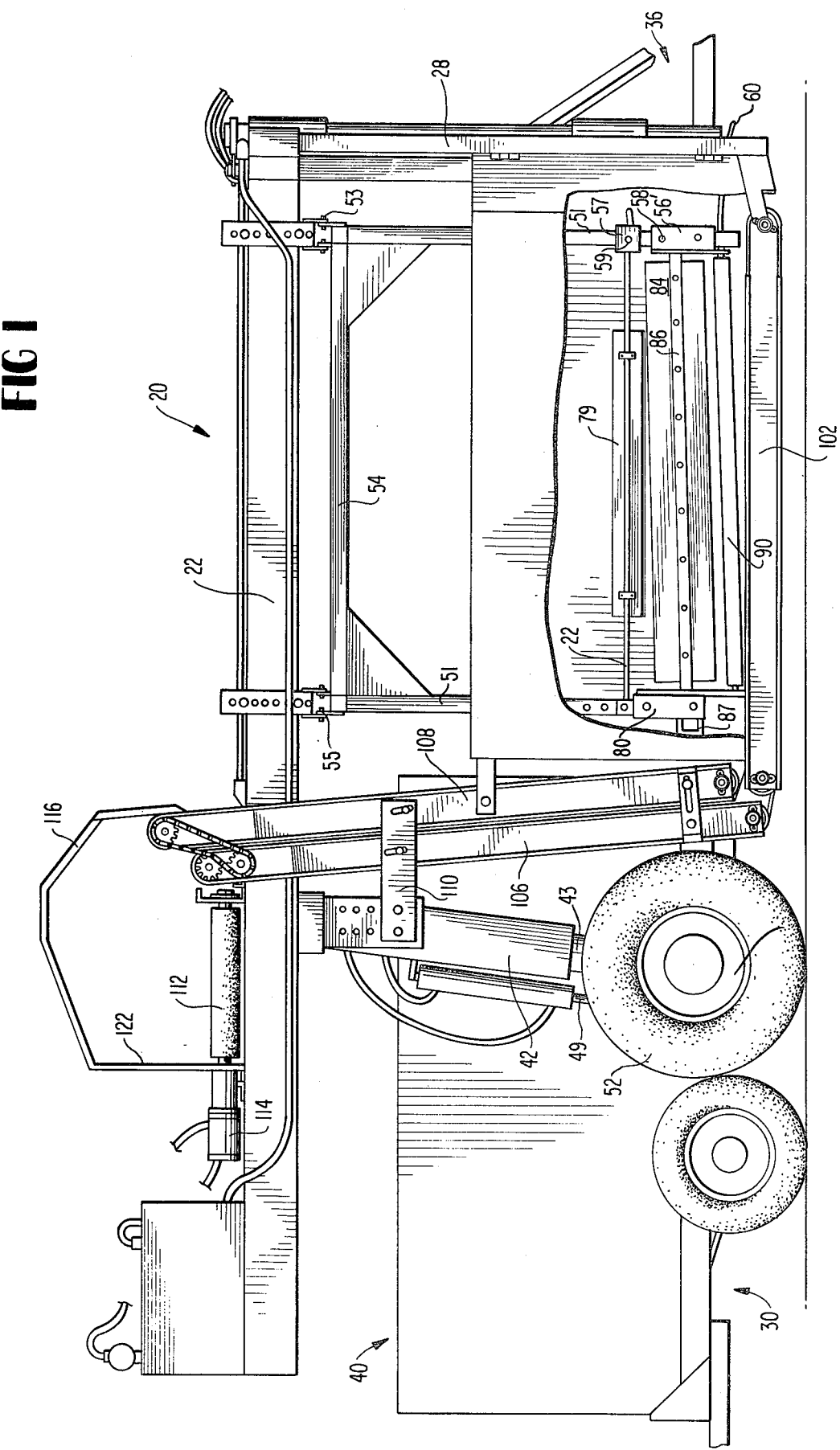
FIG. 1 is a side elevation view of the harvester according to the present invention with a portion thereof broken away for the sake of clarity.
Figure 2:
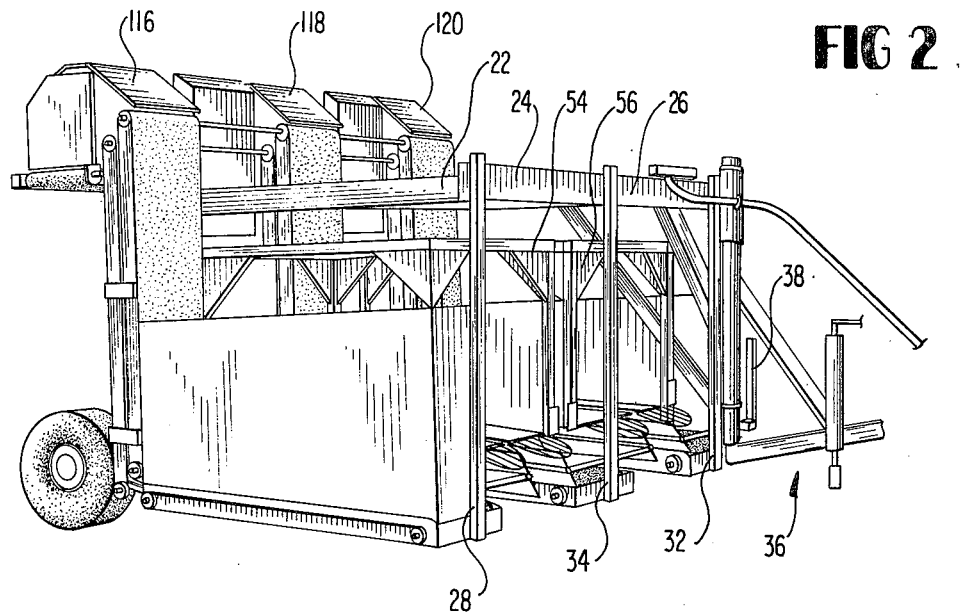
FIG. 2 is a perspective view showing the overall construction of the two-row tobacco harvester.
Figure 3:
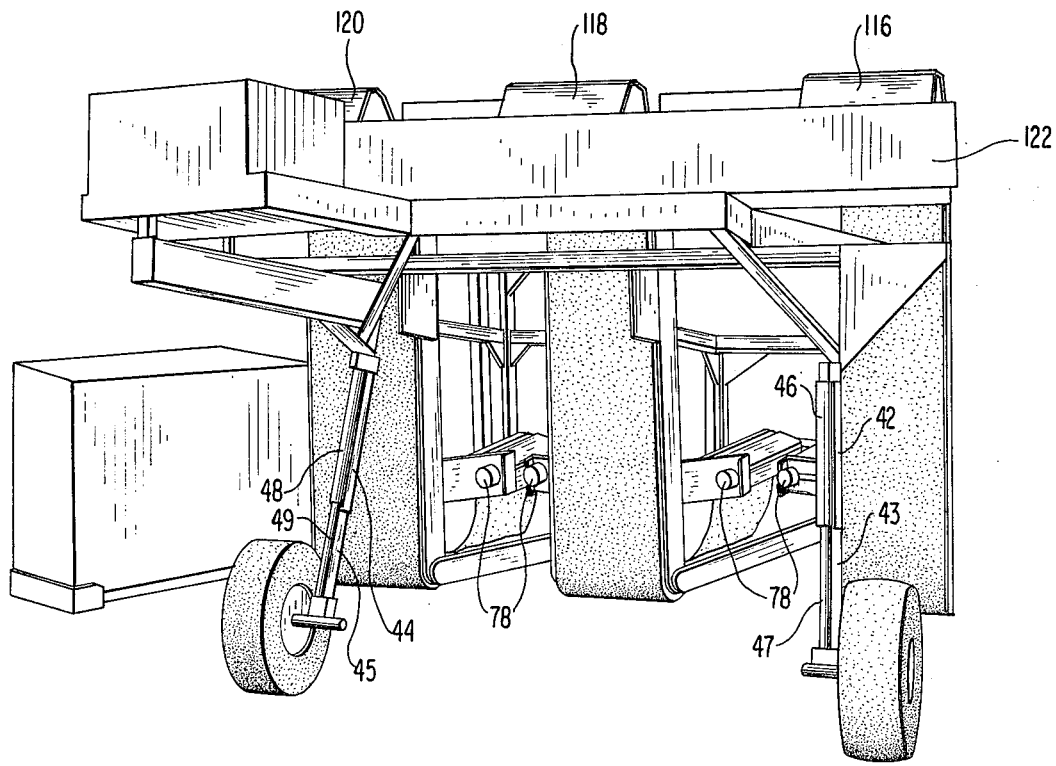
FIG. 3 is a rear elevation view of the two-row tobacco harvester showing the hydraulic adjusting means for the main frame.
Figure 4:
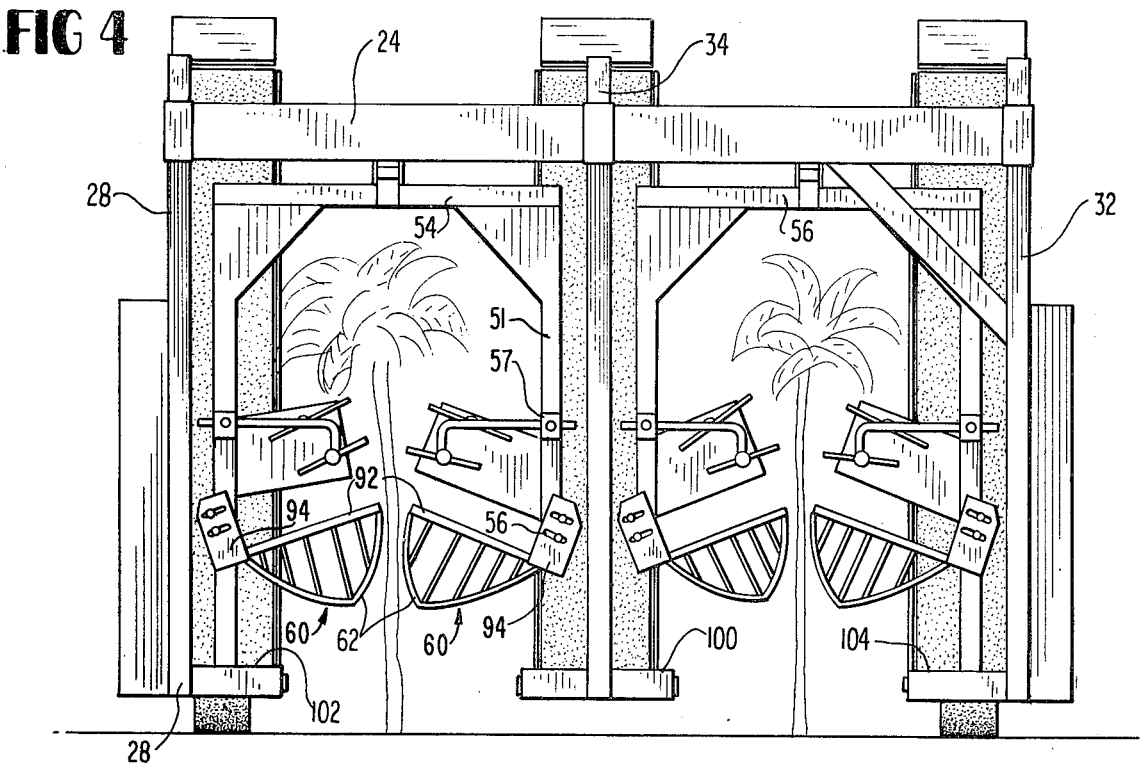
FIG. 4 is a front elevation view showing a laterally movable subframe pivotably mounted in the main frame.
Figure 5:
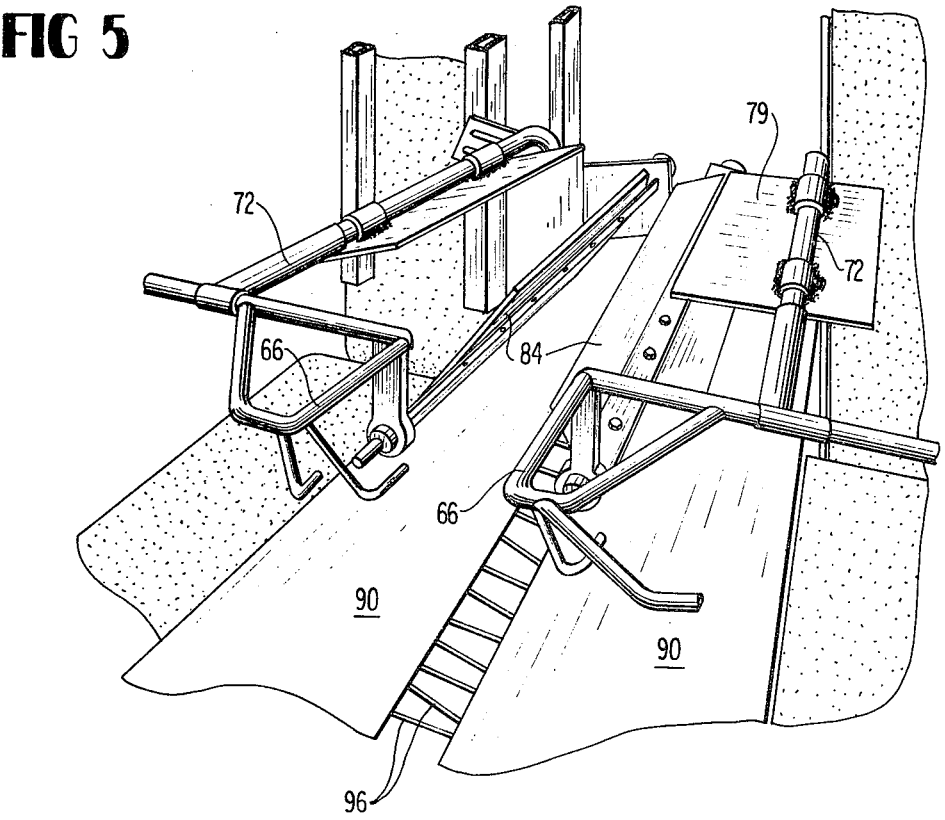
FIG. 5 is a front perspective view showing the details of the defoliator blades, deflector blades and header boards.
Figure 6:
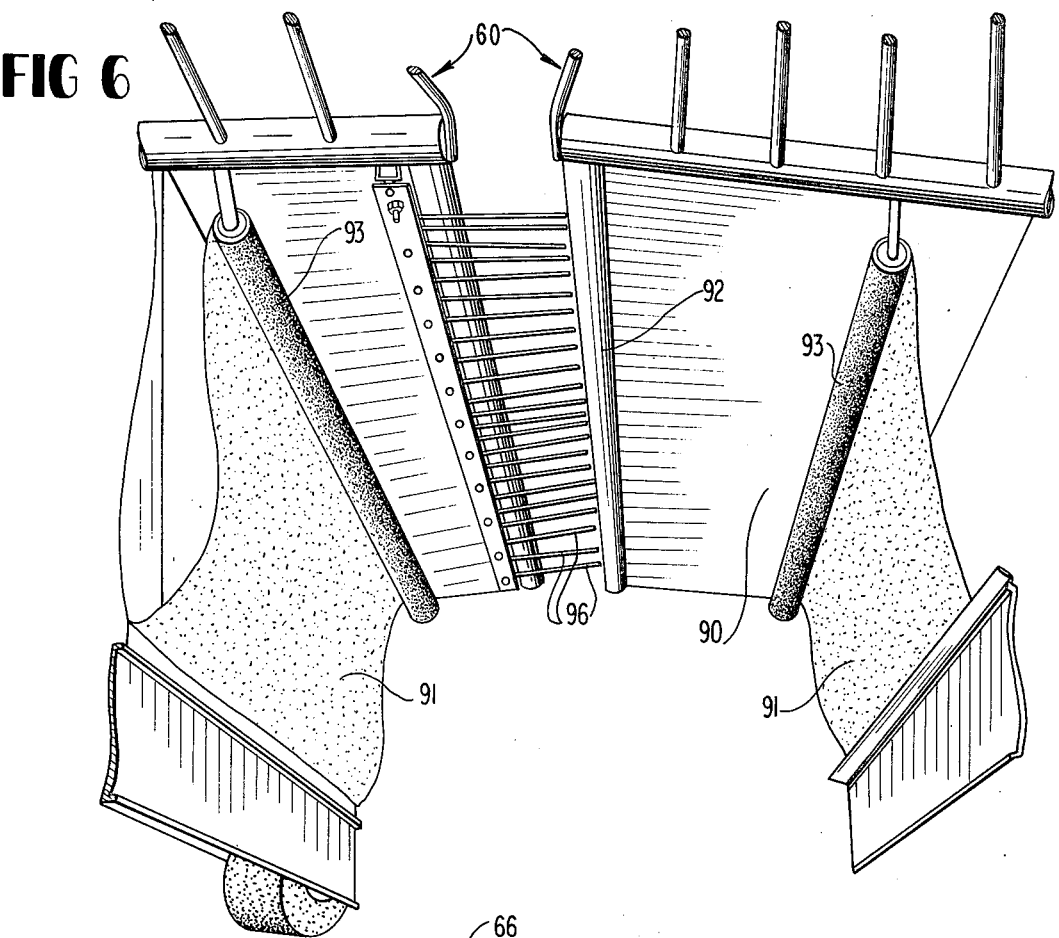
FIG. 6 is a bottom perspective view of the header boards, flexible fingers and curtains.
Figure 7:
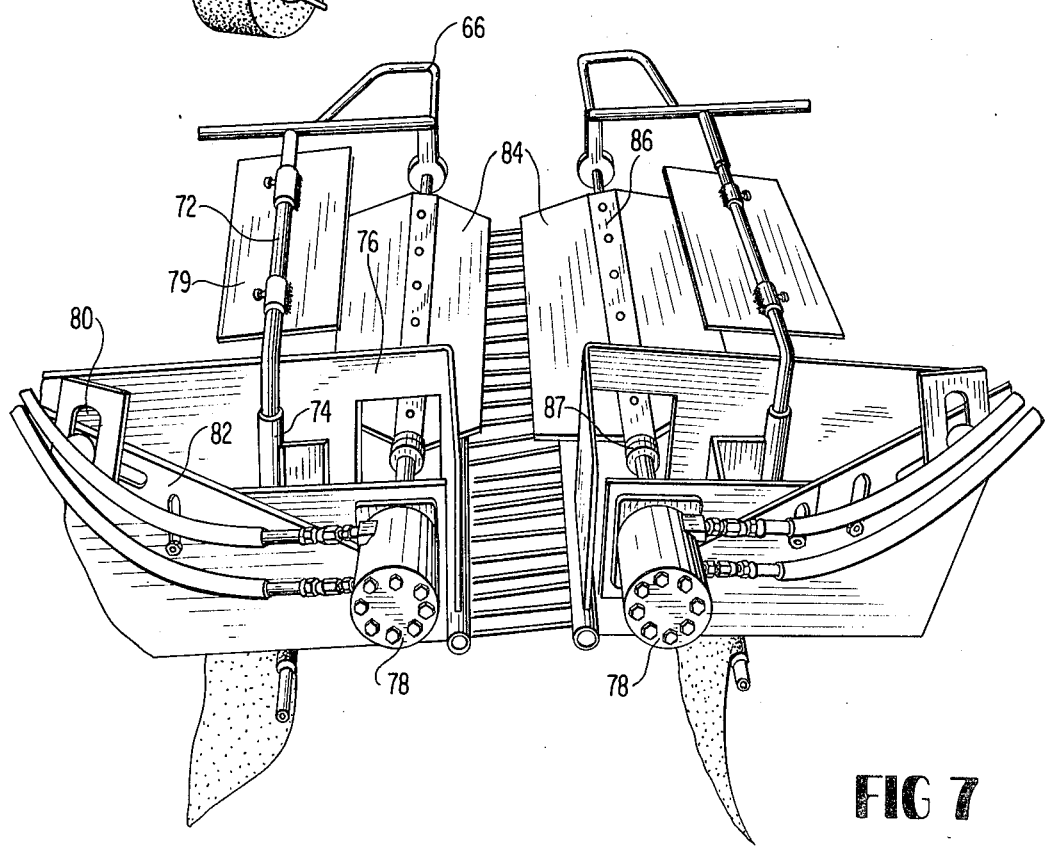
FIG. 7 is a rear perspective view showing the drive means for the defoliator blades.

The present invention directed to a two-row tobacco harvester is an improvement over applicant's harvesting device disclosed in U.S. Pat. No. 4,069,648 which is only capable of harvesting one row of tobacco at a time.

Many features such as the details of the conveyor means and the adjustable hitch means for coupling the harvester to a tractor are identical in the present application and in the aforesaid patent and therefore the details with respect to these features will be omitted from the present application.

The tobacco harvester 20 according to the present invention is a trailer type non-powered vehicle adapted to be towed by a tractor (not shown). An additional trailer 30 which is adapted to carry a conventional tobacco curing box 40 can be towed either from the tobacco harvester 20 or from the tractor depending upon the type of hitch utilized. The trailer tongue assembly generally designated as 36 is identical to that shown in the above-identified patent and a hitch means 38 is provided on the side of the harvester 20 to which the trailer 30 may be connected.

The tobacco harvester 20 is provided with a main rectangular frame 22 having lateral extensions 24 and 26 extending outwardly therefrom at either side adjacent the front end of the harvester. A pair of downwardly extending beams 42 and 44 are provided, one at each side of the main frame 22 each of which is provided with a telescopic extension 43 and 45, respectively which carry the rear supporting wheels 52. A pair of hydraulic cylinders 46 and 48 are secured to each beam 42 and 44 respectively with the pistons 47 and 49 of each cylinder being connected to the telescopic extensions 43 and 44 respectively. The cylinders are of the double acting hydraulic type and are connected into the hydraulic circuit for the tobacco harvester which is described in detail in the aforementioned patent and suitable valve means (not shown) are provided for extending and retracting the cylinder and piston assembly to selectively adjust the height of the main frame 22 relative to the wheels 52. The conventional hydraulic hitch arrangement on the tractor (not shown) is vertically adjustable so that the front end of the harvester 20 may be vertically adjusted in this manner along with the vertical adjustment of the rear of the harvester by the hydraulic cylinders 46 and 48.

A pair of defoliator subframes 54 and 56' are pivoted from the main frame 22 for lateral movement to accommodate variations in the rows of tobacco plants. Each subframe is pivoted from a longitudinally extending beam of the main frame 22 by means of longitudinally extending pivots 53 and 55. The details of the pivotal arrangement are identical for both subframes and have been described fully in the above-identified patent. Since each subframe assembly is identical only one subframe assembly will be described in detail hereinafter.

A sleeve 56' is slidably mounted at the lower end of each of the front posts 51 of the subframe 54 and may be secured in one of several possible positions by means of bolts 58 extending through aligned apertures in the sleeve 56 and the posts 51. A pair of guide rod assemblies 60 having forwardly diverging opposed surfaces 62 are connected to the sleeves 56 for initially engaging the stalk of a tobacco plant to center the frame with respect to the plant. Additional sleeves 57 are slidably mounted on the front posts 51 above the sleeve 56'. Secured to each sleeve 57 is a tobacco leaf guide 66 which is adapted to be disposed between the leaves which are to be removed from the stalk and the leaves which are to be retained on the stalk for further ripening. The sleeves 57 are adjustably secured to the posts 51 by set means 59. Thus the height of the stalk guides 60 and the leaf guides 66 can be adjusted to selectively engage the leaves at a predetermined height on the stalk depending upon which pass the conveyor is making with respect to the plants in that particular row. A rod 72 extends rearwardly from each leaf guide 66 and is supported in a socket 74 at the rear end of the frame which is secured to the support plate 76 for hydraulic motor 78. A deflector blade 79 is rotatable and longitudinally adjustable on the rod 72 by means of brackets having set screws therein. Thus the leaf guides 66 and the rods 72 will be disposed along opposite sides of the row of tobacco plants for raising up the leaves which are to be retained on the stalks so that they will not be engaged by the defoliators and the deflector blades 79 will deflect any leaves which are stripped from the plant downwardly onto the conveyor means which will be described hereinafter.

A pair of sleeves 80 similar to the sleeves 56' are slidably mounted at the lower ends of the rear most support posts 51 of the subframe 54. A pair downwardly and inwardly extending support plates 82 are secured to each sleeve 80 and the sleeves 80 are adjustable vertically on the posts 51 in the same manner as the sleeves 56' are adjustable. The support plates 82 are spaced apart a distance sufficient to allow the passage of the stalk of a tobacco plant therebetween and a pair of parallel rotary defoliators 84 are journalled at each end in the support plates 82 and in laterally extending portions of the leaf guides 66. Each defoliator is comprised of a flat flexible substantially rectilinear blade 84 secured between a pair of strips 86. The forward ends of the strips 86 are secured to a shaft which is journalled in the lateral support portion of the leaf guide 66 and the rear ends of the strip 86 are connected by universal couplings 87 to shafts 88 which are journalled and extend through the support plate 82. Each shaft 88 is coupled to a hydraulic motor 78. The defoliators 84 mounted on opposite sides of the tobacco stocks and upon rotation of the same the flexible blades will engage the stalk with a downward wiping motion to strip the tobacco leaves from the stalk. The motors 78 are coupled into the hydraulic circuitry of the harvester which was described in detail in the above-identified patent and suitable control means may be provided in the circuit to each hydraulic motor 78 for varying the speed thereof.

In addition to the deflector blades 79 located above the defoliator blades 84, a flat substantially rigid header board 90 is disposed beneath each defoliator blade 84. Each board is secured to a rectangular frame 92 to which the guide assembly 60 is secured at the front end thereof. Each frame 92 is connected to a plate 94 which is angularly adjustable relative to the sleeve 56'. A similar attachment means is provided at the rear of each header board 90 for securing the rear end of each header board frame 92 to a rear vertical support post 51. Thus the header boards 90 may be vertically adjustable at either end and the angle at which each header board is disposed relative to the subframe may be varied so that the leaves stripped from the tobacco plants by the defoliator blade will slide off the header boards onto the adjacent conveyor assembly.

A plurality of flexible fingers 96 of rubber, plastic or any other suitable material are secured to the opposing edges of each frame 92 and extend substantially across the gap between the two header boards 90. These flexible fingers will allow the stalk of the tobacco plant to pass between the header boards 90 while still preventing leaves from falling between the header boards 90 onto the ground.

The leaves stripped from the tobacco plant will be deflected by the deflector plates 79 as well as the header boards 90 toward the opposite sides of each subframe. A central longitudinal conveyor 100 is disposed between the two subframes in underlying relation with respect to the outer edges of the header boards 90 in each frame. The forward end of the conveyor 100 is supported by means of a vertical post 34 secured to the main frame 22 and similar longitudinal conveyors 102 and 104 are mounted underneath the outermost edges of each subframe by means of vertical support posts 28 and 32. At the rear end of the longitudinal conveyor 102 a pair of substantially vertically extending opposed conveyors 106 and 108 are supported from the beam 42 by means of a bracket 110. Similar pairs of vertically disposed conveyor units are mounted at the rear end of the conveyors 100 and 104. The details of the construction and operation of the horizontal longitudinally extending conveyors and the vertically extending conveyors is fully set forth in the above-identified patent. Thus the leaves which are stripped from the tobacco plants by the defoliator blades 84 are deflected outwardly away from the rows of plants by the deflector blade 79 and the header boards 90 onto the longitudinally extending conveyors which convey the tobacco leaves rearwardly to the substantially vertically extending conveyors which will transport the leaves upwardly to the top of the main frame 22.

The longitudinal edge of each header board frame 92 opposite the edge having the flexible fingers thereon has a flexible curtain 91 secured thereto. The curtain 91 may be secured directly to the frame 92 or to a roller 93 which will permit the slack in the curtain to be rolled up. The lower edge of the flexible curtain 91 is secured to the edge of the adjacent conveyor frame. The curtains 91 prevent the leaves from falling to the ground as they are transferred from the header boards 90 to the conveyors especially when the header boards are substantially vertically spaced from the conveyors.

A transverse conveyor 112 is mounted on the upper surface of the main frame 22 and is driven by means of a hydraulic motor 114 in the manner described in the above-identified patent. Arcuate deflectors 116, 118 and 120 are secured to the top of each vertically disposed conveyor unit at one end and to a transversely extending guide wall 122 at the other end so that the leaves exiting from the top of each pair of vertically extending conveyors will be deflected downwardly by the deflectors onto the transverse conveyor 112. The conveyor 112 will then transport the tobacco leaves over the side edge of the main frame 22 into the box 40 on the trailer 30. The trailer 30 may be mounted for reciprocating forward and rearward movement relative to the harvester 20 in the manner described in the above-identified patent or may be secured to the harvester for movement therewith. In the latter case an attendant is provided for distributing the leaves within the box 40 as they fall from the transversely extending conveyor 112.

In summary the two-row tobacco harvester according to the present invention provides a distinct advancement over the one-row tobacco harvester described in the above-identified patent. The use of the flat rigid adjustable header boards 90 eliminates the need for a laterally movable conveyor and all of the attendant drive mechanisms associated therewith. The provision of the deflector blade 79 prevent the leaves from flying upwardly and outwardly as they are stripped from the plant and instead deflect the leaves downwardly either directly onto the conveyor or onto the header board from which they will slide onto the conveyor. The provision of the flexible fingers between the header boards and the flexible curtains between the header boards and the conveyors prevent any leaves from falling to the ground during the harvesting operation. The provision of the dual subframes allow two rows of tobacco to be harvested simultaneously while the provision of the hydraulic cylinders on the main frame permit the vertical adjustment of the main frame relative to the wheels. This adjustment taken in conjunction with the individual adjustments of the deflector blades, defoliator blades and header boards provide an extremely versatile harvester. The adjustable speed control for the defoliator motor provides a far better control over the rate at which the leaves are stripped from the plants. Thus the speed of the defoliator blades can be coordinated with the speed of the tractor so that the leaves will be properly stripped without any damage to the plant. The provision of the arcuate deflectors which extend completely across the top of the vertical conveyors as well as the width of the transverse conveyor and the transverse guide screen to which the deflectors are secured provide a better control of the tobacco leaves as they exit from the vertical conveyors and are transported laterally to the tobacco box being pulled along side the harvester.

While the invention has been particularly shown and described with reference to a preferred embodiment thereof it will be understood by those in the art that changes in form and details may be made therein without departing from the spirit and scope of the invention.

What is claimed is:

1. A two-row tobacco harvester comprising a wheeled main frame means adapted to be pulled by a tractor along two rows of tobacco plants, a pair of identical subframe means, means movably mounting each of said subframes on said main frame in side-by-side relation for lateral movement relative to said main frame and conveyor means mounted in said main frame and extending longitudinally thereof beneath the lateral edges of each of said subframes, each of said subframe means having a pair of defoliator means rotatably mounted therein parallel to each other for rotation about substantially horizontal axes in spaced apart relation to receive a row of tobacco plants therebetween and rigid deflector means mounted on each of said subframes above and below each defoliating means to direct the leaves removed from said plants by said defoliating means laterally onto said conveyor means.

2. A two-row tobacco harvester as set forth in claim 1 wherein said main frame is provided with a pair of downwardly extending braces, wheel means telescopically movable relative to said braces and hydraulic means for adjusting the position of said wheel means relative to said brace means to vary the height of the main frame relative to said wheel means.

3. A two-row tobacco harvester as set forth in claim 1 wherein said deflector means mounted above each defoliating means is comprised of a flat, rigid substantially rectilinear deflector blade, rod means adjustably secured to said subframe means for vertical movement relative thereto and adjustable securing means for securing said deflector blade to said rod for rotatable and longitudinal adjustment relative thereto.

4. A two-row tobacco harvester as set forth in claim 1 wherein each defoliating means is comprised of a flat flexible substantially rectilinear blade, shaft means for supporting said blade for rotation about the longitudinal axis thereof, means for adjustably mounting said shaft means for vertical movement relative to said subframe means and adjustable drive means for rotating said defoliator blade at different speeds.

5. A two-row tobacco harvester as set forth in claim 1 wherein said deflecting means mounted below each defoliating means is comprised of a flat rigid substantially rectilinear header board, adjustable means for securing said header board to said subframe means for vertical adjustment relative thereto and for rotatable adjustment about the longitudinal axis of said header board.

6. A two-row tobacco harvester as set forth in claim 5 wherein the header boards disposed beneath the pair of defoliating means in each subframe means are disposed in spaced apart relation and further comprising a plurality of flexible fingers secured to the opposing edges of each of said header boards and extending substantially across the space therebetween to allow the passage of the stock of a tobacco plant therebetween while preventing leaves stripped from the plant from falling between the spaced apart header boards.

7. A two-row tobacco harvester as set forth in claim 6 further comprising flexible curtain means secured along the edge of each header board opposite the edge having said flexible fingers thereon with the opposite edge of each of said flexible curtain means being secured to the edge of the adjacent conveyor means to prevent leaves from falling to the ground between said header boards and said conveyor means.

8. A two-row tobacco harvester as set forth in claim 1 wherein said conveyor means are comprised of three longitudinally extending horizontal conveyors disposed beneath the longitudinal edges of each of said subframe means, substantially vertically disposed conveyor means mounted on said main frame adjacent the rear of each of said horizontal conveyors and transverse conveyor means mounted on said main frame adjacent the top of each of said substantially vertical conveyor means, guide wall mounted on said main frame adjacent the edge of said transverse conveyor means remote from said substantially vertical conveyor means and deflector means connected between said guide wall and each of said substantially vertically disposed conveyor means to deflect the tobacco exiting from the top of said substantially vertically disposed conveyor means onto said transverse conveyor means.

* * * * *